US009934332B1

(12) United States Patent
Thirumalai et al.

(10) Patent No.: US 9,934,332 B1
(45) Date of Patent: Apr. 3, 2018

(54) RANDOM SAMPLE AGGREGATION SIMILARITIES

(71) Applicant: Amazon Technologies, Inc., Seattle, WA (US)

(72) Inventors: Srikanth Thirumalai, Clyde Hill, WA (US); Vijai Mohan, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 301 days.

(21) Appl. No.: 14/742,930

(22) Filed: Jun. 18, 2015

(51) Int. Cl.
*G06F 17/30* (2006.01)
*G06Q 30/06* (2012.01)

(52) U.S. Cl.
CPC .. *G06F 17/30973* (2013.01); *G06F 17/30412* (2013.01); *G06F 17/30719* (2013.01); *G06F 17/30867* (2013.01); *G06Q 30/0631* (2013.01)

(58) Field of Classification Search
CPC combination set(s) only.
See application file for complete search history.

(56) References Cited

U.S. PATENT DOCUMENTS

| 8,626,607 B1* | 1/2014 | Wood | G06Q 10/04 705/26.41 |
| 2008/0077528 A1* | 3/2008 | Neff | G06Q 20/102 705/44 |
| 2012/0023101 A1* | 1/2012 | Heimendinger | G06F 17/30522 707/737 |
| 2013/0339154 A1* | 12/2013 | Shimizu | G06Q 30/02 705/14.66 |

* cited by examiner

Primary Examiner — Etienne Leroux
(74) Attorney, Agent, or Firm — Thomas | Horstemeyer, LLP

(57) ABSTRACT

Disclosed are various embodiments for a similarity service. Multiple samplings of user accounts are randomly selected from a pool of user accounts. Interaction history data for each of the user accounts is used to determine item similarities corresponding to each of the user account samplings. The item similarity data is aggregated to determine similar items.

20 Claims, 5 Drawing Sheets

RANDOM SAMPLE AGGREGATION SIMILARITIES

BACKGROUND

Item-to-item relationships based on user activity may be used to determine similar items. Aberrant user activity may affect which items are recommended.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Customer activity in an electronic commerce system may be used to determine item-to-item similarities for the purpose of generating item recommendations, or aggregating other selections of items. For example, when a user visits an item detail page for a particular item, the electronic commerce system may determine which items were purchased with the viewed item. These items may then be recommended as complementary items for the viewed item. As another example, the electronic commerce system may determine which items were browsed in the same session as a viewed item. These items may then be recommended as alternatives to the viewed item.

When user behavior is used as a basis for determining item-to-item similarities, some behavior may deviate from trends with respect to other users. For example, items that are temporarily discounted may be more frequently purchased together due to the discount, but are otherwise unrelated. Outside of the discount period, these purchases may not be indicative of a true similarity between the items. As another example, a given item may have a price falling below a threshold to receive free shipping or another benefit. A user may purchase an otherwise unrelated item to bring the total order price above the threshold for free shipping. When taken in aggregate with other customer activity, these aberrant purchases may introduce noise into statistical or relationship models to determine item-to-item similarities.

A similarity service aggregates multiple samplings of user accounts. Each sampling may be selected with replacement. When a user account is selected for inclusion in a sample in which it is already included, the selection is discarded. Thus, the overall sample size for each sampling is smaller than the total number of user accounts. For each sampling of user accounts, the similarity service selects the interaction history for the sampled user accounts to generate a corresponding instance of item similarity data. The item similarity data for each of the samplings of user accounts is then aggregated to select items for communication to a client.

In the following discussion, a general description of the system and its components is provided, followed by a discussion of the operation of the same.

Figure 1:
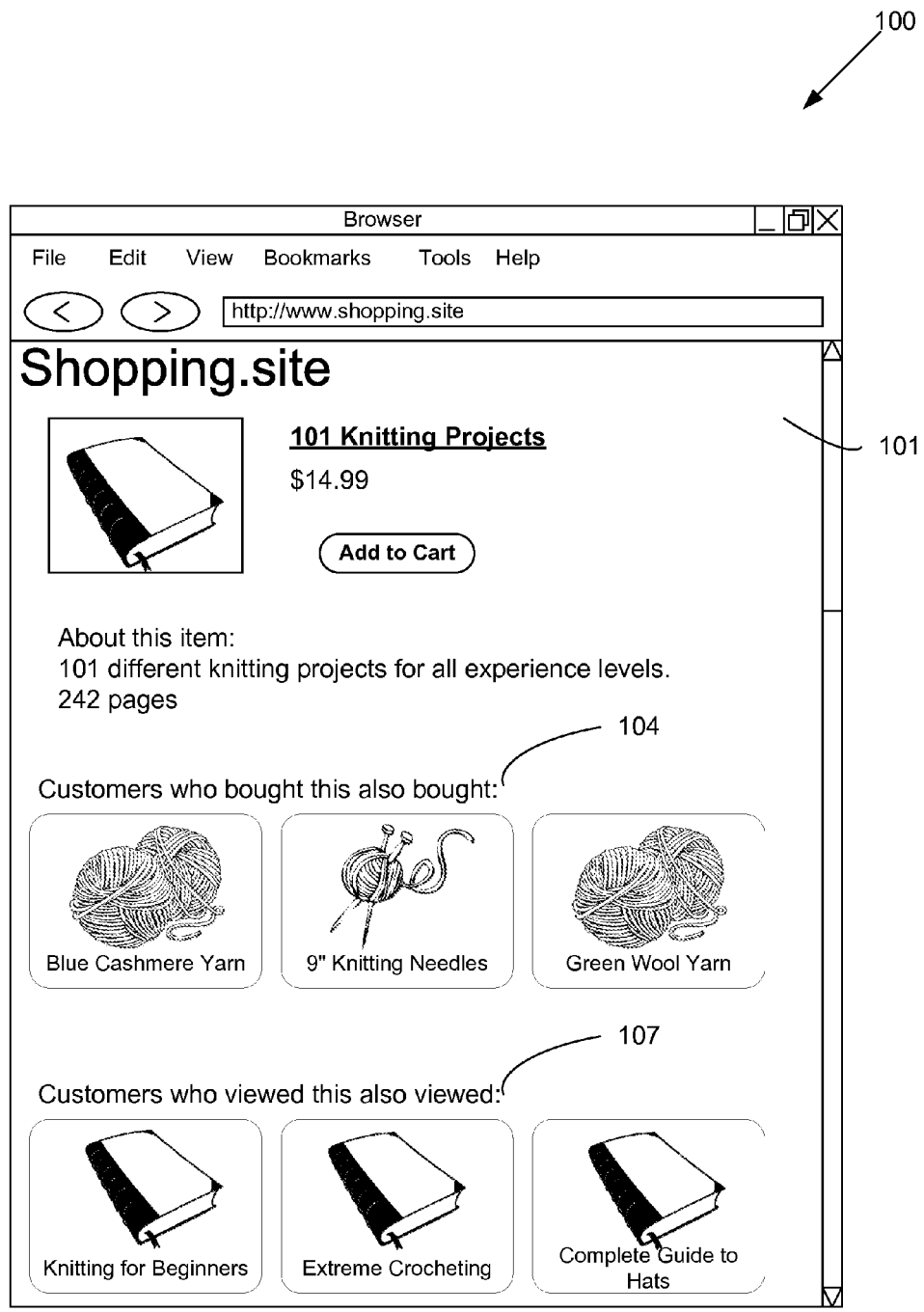
FIG. 1 is a pictorial diagram depicting an example scenario according to various embodiments of the present disclosure.

With reference to FIG. 1, shown is a pictorial diagram depicting an example scenario 100 according to various embodiments of the present disclosure. The example scenario 100 depicts a user interface 101 rendering an item detail network page of an electronic commerce system. Within the item detail page is a selection 104 of items purchased with the item viewed in the item detail page. Also within the item detail page is a selection 107 of items browsed in the same session as the item viewed in the item detail page. The items included in the selection 104 and selection 107 were selected according to item-to-item similarities determined by a similarity service and based on customer interactions via the electronic commerce system with respect to the item viewed in the item detail page.

Figure 2:
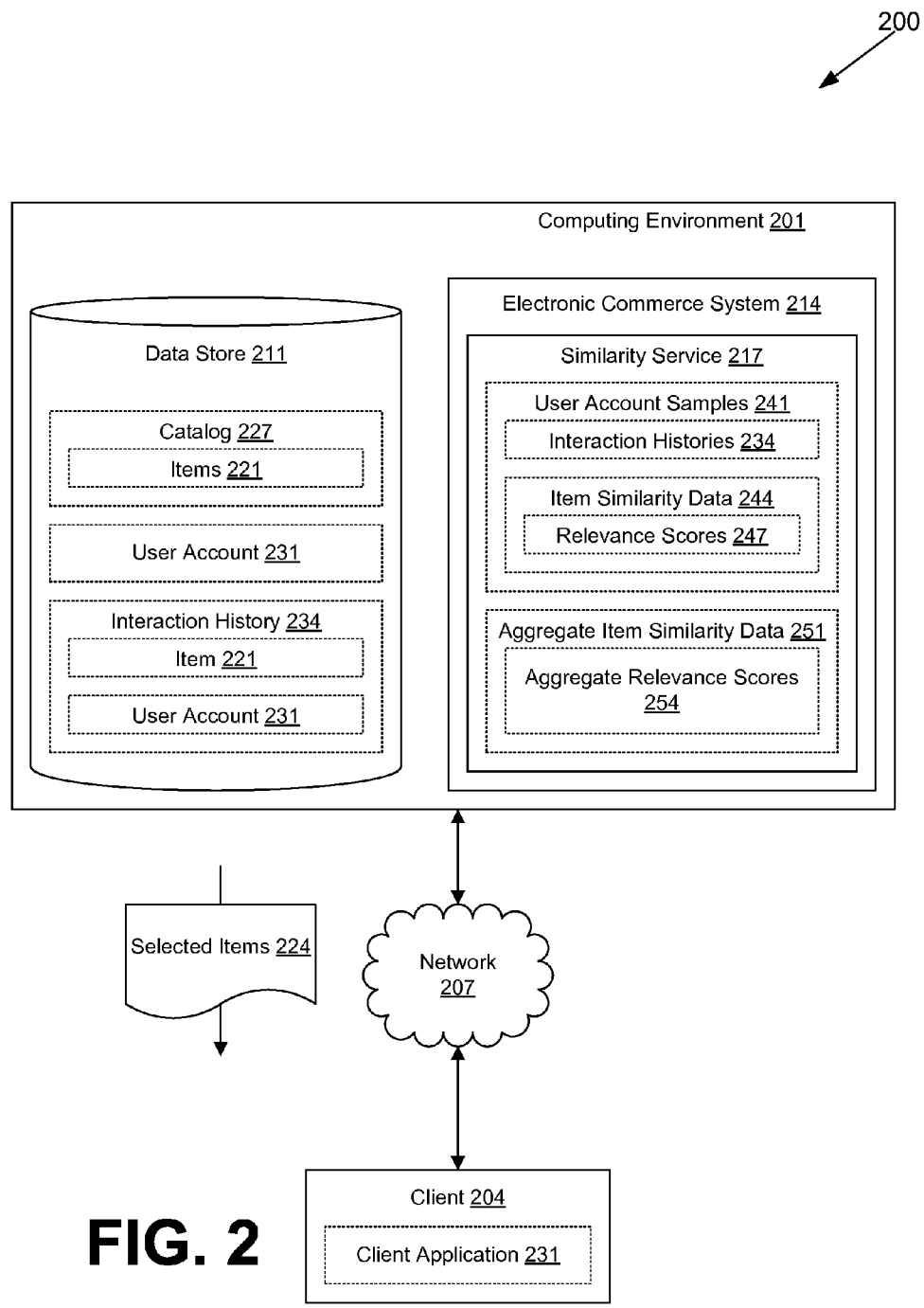
FIG. 2 is a drawing of a networked environment according to various embodiments of the present disclosure.

Turning now to FIG. 2, shown is a networked environment 200 according to various embodiments. The networked environment 200 includes a computing environment 201, and a client 204, which are in data communication with each other via a network 207. The network 207 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 201 may comprise, for example, a server computer or any other system providing computing capability. Alternatively, the computing environment 201 may employ a plurality of computing devices that may be arranged, for example, in one or more server banks or computer banks or other arrangements. Such computing devices may be located in a single installation or may be distributed among many different geographical locations. For example, the computing environment 201 may include a plurality of computing devices that together may comprise a hosted computing resource, a grid computing resource and/or any other distributed computing arrangement. In some cases, the computing environment 201 may correspond to an elastic computing resource where the allotted capacity of processing, network, storage, or other computing-related resources may vary over time.

Various applications and/or other functionality may be executed in the computing environment 201 according to various embodiments. Also, various data is stored in a data store 211 that is accessible to the computing environment 201. The data store 211 may be representative of a plurality of data stores 211 as can be appreciated. The data stored in the data store 211, for example, is associated with the operation of the various applications and/or functional entities described below.

The components executed on the computing environment 201, for example, include an electronic commerce system 214 having a similarity service 217, and other applications, services, processes, systems, engines, or functionality not discussed in detail herein. The electronic commerce system 214 is executed in order to facilitate the online purchase of items 221 over the network 207. The electronic commerce system 214 also performs various backend functions associated with the online presence of a merchant in order to facilitate the online purchase of items 221 as will be described. For example, the electronic commerce system 214 generates network pages such as web pages or other types of network content that are provided to clients 204 for the purposes of selecting items for purchase, rental, download, lease, or other form of consumption as will be described. The similarity service 217 is executed to aggregate selected items 224 for communication to a client 204.

The data stored in the data store 211 includes, for example, a catalog 227 of items 221, user accounts 231, interaction history 234 and potentially other data. The catalog 227 encodes a collection of items 221 to facilitate presentation of item 221 information via the electronic commerce system 214. For example, the catalog 227 may classify items 221 into categories, sub-categories, or other classifications. As another example, the catalog 227 may classify items 221 according to a taxonomy embodied as one or more taxonomy nodes. The catalog 227 may also encode item 221 data by another approach.

User accounts 231 comprise data associated with one or more customers of the electronic commerce system 214. User accounts 231 may comprise, for example, login information such as usernames or passwords to authenticate a customer attempting to access the electronic commerce system 214. The user accounts 231 may also comprise contact information such as a mailing address, email address, phone number or other contact information. Additionally, the user accounts 231 may comprise data representing payment instruments used to consummate an order with the electronic commerce system 214, including credit cards, debit cards, banking accounts, prepaid accounts, or other payment instruments. User accounts 231 may also comprise user preferences embodying settings, configurations, or other preferences used in interactions with the electronic commerce system 214 as will be described below.

The interaction history 234 indicates an interaction with one or more items 221 via a user account 231 of the electronic commerce system 214. To this end, user accounts 231 may be considered as having respective entries in the interaction history 234, indicating which items 221 were interacted with through the respective user account 231. For example, the interaction history 234 may include a purchase history indicating the purchase of one or more items 221 via a respective user account 231. As another example, the interaction history 234 may include a browse history indicating a browsing or viewing of one or more items 221 via a respective user account 231. The interaction history 234 may also indicate other actions, such as an addition of an item 221 to a list such as a shopping cart, with list, or other list via a respective user account 231. The interaction history 234 may also indicate other actions.

The client 204 is representative of a plurality of client devices that may be coupled to the network 207. The client 204 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 204 may include a display. The display may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client 204 may be configured to execute various applications such as a client application 237 and/or other applications. The client application 237 may be executed in a client 204, for example, to access network content served up by the computing environment 201 and/or other servers, thereby rendering a user interface on the display. To this end, the client application 237 may comprise, for example, a browser, a dedicated application, etc., and the user interface may comprise a network page, an application screen, etc. The client 204 may be configured to execute applications beyond the client application 237 such as, for example, email applications, social networking applications, word processors, spreadsheets, and/or other applications.

Next, a general description of the operation of the various components of the networked environment 200 is provided. To begin, the similarity service 217 selects multiple sets of user account samples 241. A user account sample 241 is a subset of the corpus of user accounts 231. To select a user account sample 241, the similarity service 217 repeatedly selects a user account 231 for inclusion in the user account sample 241. The user accounts 231 may be selected according to a random process, or by another approach. Additionally, the user accounts 231 may be selected with replacement, such that a user account 231 already included in a given user account sample 241 may be selected again for inclusion in the given user account sample 241. In such an embodiment, the user account 231 would be selected but not added to the given user account sample 241, such that a user account 231 is only reflected once in a given user account sample 241.

Thus, in embodiments in which a predefined number of selections are made for the user account sample 241, the total number of user accounts 231 in the user account sample 241 may be less than the predefined number of selections due to discarded duplicate selections. The predefined number of selections may include a number of user accounts 231 in the corpus of user accounts 231. For example, if the corpus of user accounts 231 includes M user accounts. For each user account sample 241, the similarity service 217 may perform M selections of user accounts 231 to include in a given sample 241. Since the user accounts 231 are being selected with replacement with duplicates discarded, the final number of user accounts 231 in a given sample is likely to be less than M. Furthermore, although a user account 231 with aberrant behavior may be selected according to the random process, the resulting user account samples 241 are more likely to reflect more typical behavior due to being selected with replacement across multiple user account samples 241.

According to the approach set forth above, the similarity service 217 selects multiple instances of user account samples 241, such that a plurality of subsets of the user accounts 231 are selected. For each of these user account samples 241, the similarity service 217 then selects the corresponding interaction histories 234 for the user accounts 231 reflected in the corresponding user account samples 241. In doing so, each user account sample 241 now has a corresponding interaction history 234.

Next, for each of the user account samples 241, the similarity service 217 applies a similarity algorithm to the corresponding interaction histories 234 to generate item similarity data 244. This results in each of the user account samples 241 now having a corresponding set of item similarity data 244. The item similarity data 244 encodes an item 221 to item 221 relationship indicating a degree of similarity between the respective items 221. To this end, the similarity algorithm may include a collaborative filtering algorithm such as a Bayesian model, a clustering algorithm, a latent semantic model, a markov model, or other collaborative filtering algorithm. Additionally, the item similarity data 244 may be generated according to another similarity algorithm as can be appreciated.

In some embodiments, the item similarity data 244 may be encoded as a discrete or binary value, indicating whether or not two items 221 are similar. In other embodiments, the item similarity data 244 may be encoded as relevance scores 247 indicating to what degree two items are similar 221. Item similarity data 244 may also be encoded by another approach.

Next, the similarity service 217 aggregates the item similarity data 244 for each of the user account samples 241 to generate a single set of aggregate similarity data 251. This may include, for example, calculating a frequency to which an item 221 to item 221 relationship is indicated in the respective sets of item similarity data 244. In embodiments in which the item similarity data 244 is encoded as relevance scores 247, calculating the aggregate item similarity data 251 may include calculating aggregate relevance scores 254 corresponding to respective entries in the item similarity data 244. The aggregate relevance scores 254 may be calculated by applying an aggregate function such as a summation, average, weighted average, minimum, maximum, median, or other aggregate function to each relevance score 247 corresponding to the same item 221 to item 221 relationship. In other words, for each set of item similarity data 244, entries reflecting the same item 221 to item 221 relationship are selected and their respective relevance scores 247 aggregated to create a single entry in the aggregate item similarity data 251 that includes the aggregate relevance score 254. The aggregate item similarity data 251 may also be generated by another approach.

Using the aggregate item similarity data 251, the similarity service 217 then selects one or more selected items 224 for communication to a client 204. The selected items 224 may include items 221 that are recommended for purchase by a user. The selected items 224 may include those items 221 significantly purchased or otherwise interacted with for a particular subset of user accounts 231 when compared to the entirety of user accounts 231. The selected items 224 may also include items 221 that are designated as similar to a particular item 221. For example, a client 204 may access an item 221 detail page via the electronic commerce system 214. The selected items 224 may be selected as being similar to the given item 221 browsed in the item 221 detail page. As another example, the selected items 224 may be selected according to a recently purchased, recently browsed, recently selected, or otherwise recently acted upon item 221.

Accordingly, aggregating selected items 224 for a given item 224 may include selecting the aggregate item similarity data 251 indicating similarities between the given item 221 and other items 221. The selected items 224 would then be selected from the other items 221. For example, this may include selecting as selected items 224 a predefined number of the other items 221 having a highest frequency of inclusion in the item similarity data 244, or having a frequency of inclusion meeting or exceeding a predefined threshold. This may also include selecting as selected items 224 a predefined number of items 221 having a highest aggregate relevance score 254, or those items 221 having aggregate relevance scores 254 meeting or exceeding a threshold. Selected items 224 may also be selected by another approach.

In another embodiment, instead of sampling from user accounts 231 to select user account samples 241, the similarity service 217 may select sample sets directly from the interaction history 234. The interaction history 234 may be sampled as was described above with respect to generating user account samples 241. For example, the interaction history 234 may be sampled, for each sample set, a predefined number of times. As another example, the interaction history 234 may be sampled randomly and with replacement. For each sample set from the interaction history 234, the electronic commerce system 214 may then generate corresponding sets of item similarity data 244, from which aggregate item similarity data 251 is generated as was described above. The aggregate item similarity data 251 may then be used to aggregate selected items 224 as was described above.

Figure 3:
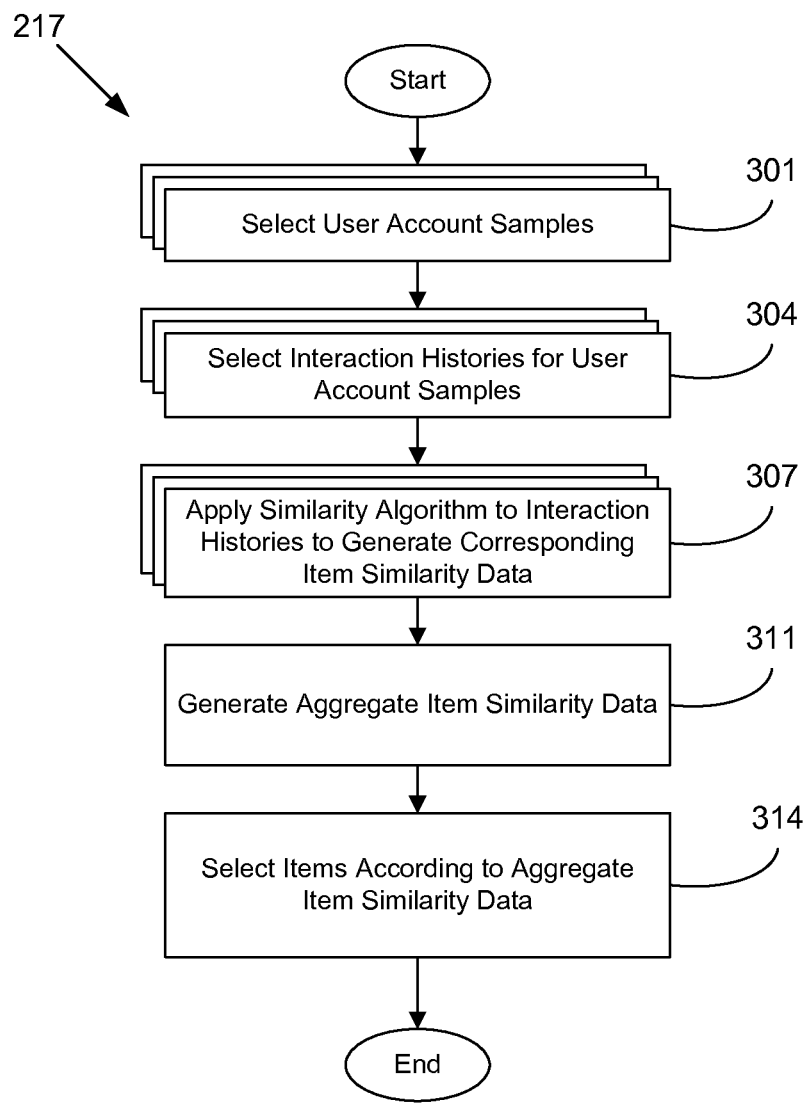
FIGS. 3 and 4 are flowcharts illustrating examples of functionality implemented as portions of a similarity service executed in a computing environment in the networked environment of FIG. 2 according to various embodiments of the present disclosure.

Moving on to FIG. 3, shown is a flowchart that provides one example of the operation of a portion of the similarity service 217 according to various embodiments. It is understood that the flowchart of FIG. 3 provides merely an example of the many different types of functional arrangements that may be employed to implement the operation of the portion of the similarity service 217 as described herein. As an alternative, the flowchart of FIG. 3 may be viewed as depicting an example of elements of a method implemented in the computing environment 201 (FIG. 3) according to one or more embodiments.

Beginning with box 301, the similarity service 217 selects multiple sets of user account samples 241 (FIG. 2). To select a user account sample 241, the similarity service 217 repeatedly selects a user account 231 (FIG. 2) for inclusion in the user account sample 241. The user accounts 231 may be selected according to a random process, or by another approach. Additionally, the user accounts 231 may be selected with replacement, such that a user account 231 already included in a given user account sample 241 may be selected again for inclusion in the given user account sample 241. In such an embodiment, the user account 231 would be selected but not added to the given user account sample 241, such that a user account 231 is only reflected once in a given user account sample 241.

Next, in box 304, for each of these user account samples 241, the similarity service 217 then selects the corresponding interaction histories 234 (FIG. 2) for the user accounts 231 reflected in the user account samples 241. In doing so, each user account sample 241 now has a corresponding interaction history 234. The similarity service 217 then, in box 307, applies a similarity algorithm to the corresponding interaction histories 234 for each of the user account samples 241 to generate corresponding item similarity data 244 (FIG. 2). This results in each of the user account samples 241 now having a corresponding set of item similarity data 244. The item similarity data 244 encodes an item 221 to item 221 relationship indicating a degree of similarity between the respective items 221. To this end, the similarity algorithm may include a collaborative filtering algorithm such as a Bayesian model, a clustering algorithm, a latent semantic model, a markov model, or other collaborative filtering algorithm. The similarity algorithm may include other algorithms, such as a matrix factorization, neural network, Pearson's coefficient, bilinear regression, or another approach. Additionally, the item similarity data 244 may be generated according to another similarity algorithm as can be appreciated.

After generating the item similarity data 244, in box 311, the similarity service 217 aggregates the item similarity data 244 for each of the user account samples 241 to generate a single set of aggregate similarity data 251 (FIG. 2). This may include, for example, calculating a frequency to which an item 221 to item 221 relationship is indicated in the respective sets of item similarity data 244. In embodiments in which the item similarity data 244 is encoded as relevance scores 247 (FIG. 2), calculating the aggregate item similarity data 251 may include calculating aggregate relevance scores 254 (FIG. 2) corresponding to respective entries in the item similarity data 244.

Using the aggregate item similarity data 251, in box 314 the similarity service 217 then aggregates one or more selected items 224 (FIG. 2) for communication to a client 204. In some embodiments, the selected items 224 are aggregated based on a given item 221. Accordingly, aggregating selected items 224 for a given item 224 may include selecting the aggregate item similarity data 251 indicating similarities between the given item 221 and other items 221. The selected items 224 would then be selected from the other items 221. For example, this may include selecting as selected items 224 a predefined number of the other items 221 having a highest frequency of inclusion in the item similarity data 244, or having a frequency of inclusion meeting or exceeding a predefined threshold. This may also include selecting as selected items 224 a predefined number of items 221 having a highest aggregate relevance score 254, or those items 221 having aggregate relevance scores 254 meeting or exceeding a threshold. Selected items 224 may also be aggregated by another approach.

Figure 4:
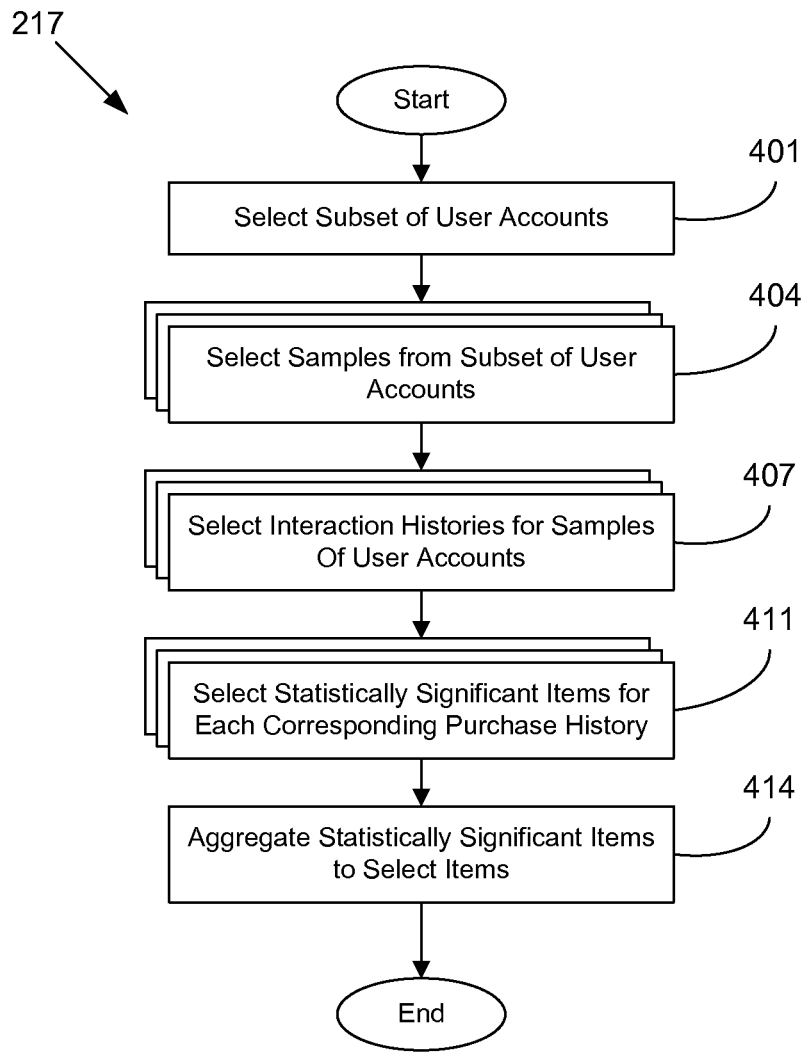

Referring next to FIG. 4, shown is a flowchart that provides one example of the operation of a portion of the similarity service 217 according to various embodiments. It is understood that the flowchart of FIG. 4 provides merely an example of the many different types of functional arrangements that may be employed to implement the operation of the portion of the similarity service 217 as described herein. As an alternative, the flowchart of FIG. 4 may be viewed as depicting an example of elements of a method implemented in the computing environment 201 (FIG. 4) according to one or more embodiments.

Beginning with box 401, the similarity service 217 selects a subset of user accounts 231 (FIG. 2) by filtering the user accounts 231 according to one or more criteria. In some embodiments, this may include selecting those user accounts 231 having a particular attribute, profile interest, demographic attribute, or other attribute. This may also include applying a bucketizing or clustering algorithm to the user accounts 231. Next, in box 404, the similarity service 217 selects multiple sets of user account samples 241 (FIG. 2) from the subset of user accounts 231.

In box 407, for each of these user account samples 241, the similarity service 217 then selects the corresponding interaction histories 234 (FIG. 2) for the user accounts 231 reflected in the user account samples 241. In doing so, each user account sample 241 now has a corresponding interaction history 234. After selecting the interaction history 234, in box 411, the similarity service 217 selects statistically significant items 221 for each of the user account samples 241 according to the respective interaction histories 234. This may include, for example, determining a rate or frequency of purchase or other interaction for the items 221 with respect to the corresponding user account sample 241. The rate or frequency may then be compared to a rate or frequency for the item 221 with respect to the corpus of user accounts 231. Thus, the similarity service 217 determines, for each user account sample 241, items 221 with statistically significant degrees of interaction when compared to a broader population of user accounts 231. A statistically significant item 221 may include an item 221 with a standard deviation of interactions meeting or exceeding a threshold. A statistically significant item 221 may also include an item 221 having a deviation between an expected co-occurrence and observed co-occurrence of interactions meeting or exceeding a threshold. Statistically significant items 221 may also be selected by another approach.

After selecting the statistically significant items 221 for each of the user account samples 241, the similarity service 217 aggregates the statistically significant items 221 as selected items 224 (FIG. 2). This may include, for example, selecting one or more items 221 having a frequency of occurrence as a statistically significant item 221 meeting or exceeding a threshold. Selected items 224 may also be aggregated by another approach.

Figure 5:
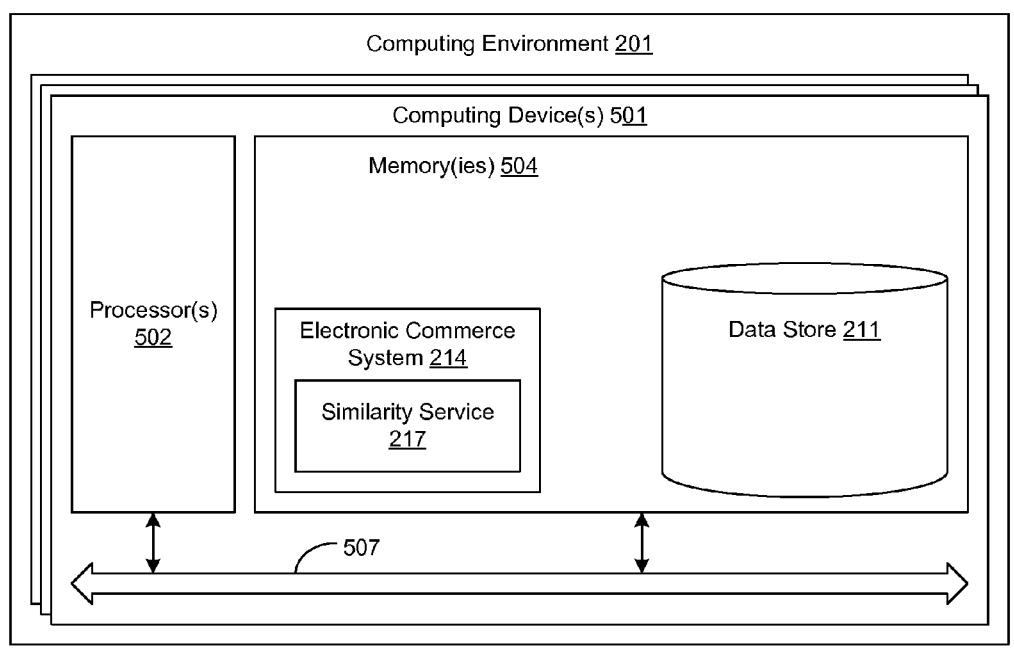
FIG. 5 is a schematic block diagram that provides one example illustration of a computing environment employed in the networked environment of FIG. 2 according to various embodiments of the present disclosure.

With reference to FIG. 5, shown is a schematic block diagram of the computing environment 201 according to an embodiment of the present disclosure. The computing environment 201 includes one or more computing devices 501. Each computing device 501 includes at least one processor circuit, for example, having a processor 502 and a memory 504, both of which are coupled to a local interface 507. To this end, each computing device 501 may comprise, for example, at least one server computer or like device. The local interface 507 may comprise, for example, a data bus with an accompanying address/control bus or other bus structure as can be appreciated.

Stored in the memory 504 are both data and several components that are executable by the processor 502. In particular, stored in the memory 504 and executable by the processor 502 are an electronic commerce system 214 having a similarity service 217, and potentially other applications. Also stored in the memory 504 may be a data store 211 and other data. In addition, an operating system may be stored in the memory 504 and executable by the processor 502.

It is understood that there may be other applications that are stored in the memory 504 and are executable by the processor 502 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 504 and are executable by the processor 502. In this respect, the term "executable" means a program file that is in a form that can ultimately be run by the processor 502. Examples of executable programs may be, for example, a compiled program that can be translated into machine code in a format that can be loaded into a random access portion of the memory 504 and run by the processor 502, source code that may be expressed in proper format such as object code that is capable of being loaded into a random access portion of the memory 504 and executed by the processor 502, or source code that may be interpreted by another executable program to generate instructions in a random access portion of the memory 504 to be executed by the processor 502, etc. An executable program may be stored in any portion or component of the memory 504 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 504 is defined herein as including both volatile and nonvolatile memory and data storage components. Volatile components are those that do not retain data values upon loss of power. Nonvolatile components are those that retain data upon a loss of power. Thus, the memory 504 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 502 may represent multiple processors 502 and/or multiple processor cores and the memory 504 may represent multiple memories 504 that operate in parallel processing circuits, respectively. In such a case, the local interface 507 may be an appropriate network that facilitates communication between any two of the multiple processors 502, between any processor 502 and any of the memories 504, or between any two of the memories 504, etc. The local interface 507 may comprise additional systems designed to coordinate this communication, including, for example, performing load balancing. The processor 502 may be of electrical or of some other available construction.

Although the similarity service 217, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3 and 4 show the functionality and operation of an implementation of portions of the similarity service 217. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 502 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the similarity service 217, that comprises software or code can be embodied in any non-transitory computer-readable medium for use by or in connection with an instruction execution system such as, for example, a processor 502 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the similarity service 217, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 501, or in multiple computing devices in the same computing environment 201. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the Therefore, the following is claimed:

1. A non-transitory computer-readable medium embodying a program executable in at least one computing device, wherein, when executed, the program causes the at least one computing device to at least:
   select a plurality of subsets of a plurality of user accounts according to a plurality of random selections with replacement such that a respective user account of the plurality of user accounts can be selected more than once;
   remove any duplicate user accounts within the plurality of subsets of the plurality of user accounts;
   select, for individual ones of the plurality of subsets of the plurality of user accounts, a corresponding plurality of interaction history entries indicating a respective purchase of at least one of a plurality of items by a user account in a corresponding one of the plurality of subsets of the plurality of user accounts;
   apply, for the individual ones of the plurality of subsets of the plurality of user accounts, a collaborative filtering algorithm to the corresponding plurality of interaction history entries to generate a corresponding one of a plurality of sets of item similarity data, the plurality of sets of item similarity data indicating a respective degree of similarity between the plurality of items associated with the corresponding plurality of interaction history entries;
   determine, for those of the plurality of items included in the plurality of sets of item similarity data, a corresponding aggregate item similarity data based at least in part on the item similarity data;
   select at least one item based at least in part on the plurality of aggregate item similarity data;
   generate a user interface associated with an electronic commerce system, the user interface including the at least one item; and
   transmit the user interface including the at least one item to a client device.

2. The non-transitory computer-readable medium of claim 1, wherein the aggregate item similarity data comprises a plurality of aggregate relevance scores comprise at least one of a plurality of average relevance scores, a plurality of maximum relevance scores, or a plurality of summed relevance scores.

3. A system, comprising:
   at least one computing device; and
   an application executed in the at least one computing device, wherein, when executed, the application causes the at least one computing device to at least:
     select a plurality of interaction history sets, individual ones of the plurality of interaction history sets comprising a corresponding plurality of interaction history entries indicating a respective purchase of at least one of a plurality of items by one of a plurality of user accounts;
     apply, for the individual ones of a plurality of subsets of the plurality of interaction history sets, a similarity algorithm to the corresponding plurality of interaction history entries to generate a corresponding one of a plurality of sets of item similarity data, the corresponding one of the plurality of sets of item similarity data indicating a degree of similarity between the plurality of items included within the corresponding plurality of interaction history entries; and
     select at least one item based at least in part on an aggregation of the plurality of sets of item similarity data.

4. The system of claim 3, wherein selecting the plurality of interaction history sets further comprises:
   selecting a plurality of subsets of the plurality of user accounts; and
   selecting, for individual ones of the plurality of subsets of the plurality of user accounts, a corresponding one of the plurality of interaction history sets.

5. The system of claim 4, wherein selecting the plurality of subsets of the plurality of user accounts further comprises selecting, for individual ones of the plurality of subsets of the user accounts, a predefined number of the plurality of user accounts with replacement such that a respective user account of the plurality of user accounts can be selected more than once.

6. The system of claim 5, wherein the predefined number comprises a number of user accounts in the plurality of user accounts.

7. The system of claim 5, wherein the plurality of subsets of the plurality of user accounts are randomly selected.

8. The system of claim 3, wherein the similarity algorithm comprises a collaborative filtering algorithm.

9. The system of claim 8, wherein the collaborative filtering algorithm comprises at least one of a Bayesian model, a clustering algorithm, a latent semantic model, or a Markov model.

10. The system of claim 3, wherein selecting the at least one item further comprises:
    calculating, for those of the plurality of items included in the plurality of sets of item similarity data, a corresponding one of a plurality of frequencies of occurrence in the plurality of sets of item similarity data; and
    selecting the at least one item based at least in part on the plurality of frequencies of occurrence.

11. The system of claim 3, wherein the plurality of sets of item similarity data comprise a plurality of relevance scores, and selecting the at least one item further comprises:
    calculating for those of the plurality of items included in the plurality of sets of item similarity data, a corresponding one of a plurality of aggregate relevance scores based at least in part on the plurality of relevance scores; and
    selecting the at least one item based at least in part on the plurality of aggregate relevance scores.

12. The system of claim 11, wherein calculating the corresponding one of the plurality of aggregate relevance scores comprises applying an aggregate function to a subset of the plurality of relevance scores corresponding to a respective one of the plurality of items included in the plurality of sets of item similarity data.

13. The system of claim 12, wherein the aggregate function comprises an average, a maximum, a summation, or a median function.

14. A method, comprising:
    selecting, by at least one computing device, a first subset of a plurality of user accounts;
    selecting, by the at least one computing device, a plurality of second subsets of the plurality of user accounts from the first subset of the plurality of user accounts with replacement such that a respective user account of the plurality of user accounts can be selected more than once;

selecting, by the at least one computing device, for individual ones of the plurality of second subsets of the plurality of user accounts, a corresponding plurality of interaction history entries indicating a respective purchase of at least one of a plurality of items by a user account in a corresponding one of the plurality of second subsets of the plurality of user accounts;

determining, by the at least one computing device, for individual ones of the plurality of second subsets of the plurality of user accounts, a respective one of a plurality of collections of statistically significant items based at least in part on the corresponding plurality of interaction history entries and a degree of interaction with a respective item of the plurality of items associated with the corresponding plurality of interaction history entries; and selecting, by the at least one computing device, at least one item based at least in part on an aggregation of the plurality of collections of statistically significant items.

15. The method of claim 14, further wherein the first subset of the plurality of user accounts is selected based at least in part on a profile attribute of the plurality of user accounts.

16. The method of claim 14, wherein determining the respective one of the plurality of collections of statistically significant items comprises determining, by the at least one computing device, at least one item having a statistically significant amount of purchases indicated in the corresponding plurality of interaction history entries.

17. The method of claim 16, further wherein the statistically significant amount of purchases is statistically significant relative to an amount of purchases corresponding to the plurality of user accounts.

18. The method of claim 14, wherein selecting the plurality of second subsets of the plurality of user accounts comprises:

selecting, for individual ones of the plurality of second subsets of the plurality of user accounts a predefined number of user accounts from the first subset of the plurality of user accounts; and removing any duplicate user accounts from the plurality of second subsets of the plurality of user accounts.

19. The method of claim 18, wherein the predefined number comprises a number of user accounts in the first subset of the plurality of user accounts.

20. The method of claim 18, wherein the plurality of second subsets of the plurality of user accounts are randomly selected.

* * * * *